United States Patent [19]

Rivet

[11] 4,156,746
[45] May 29, 1979

[54] METHOD AND MIXTURE FOR PRODUCING AN ARTIFICIAL SKIING TRACK

[75] Inventor: Gisele Rivet, San Jose, Costa Rica

[73] Assignee: Establissement Alajex, Vaduz, Liechtenstein

[21] Appl. No.: 846,530

[22] Filed: Oct. 28, 1977

Related U.S. Application Data

[63] Continuation-in-part of Ser. No. 641,156, Dec. 15, 1975, abandoned, which is a continuation-in-part of Ser. No. 457,254, Apr. 2, 1974, abandoned.

[51] Int. Cl.² .............................................. A63G 21/00
[52] U.S. Cl. .............................. 427/136; 272/56.5 SS; 427/180; 427/202
[58] Field of Search ....................... 427/180, 136, 202; 272/56.5 SS; 252/49.5; 251/1; 106/286

[56] References Cited

U.S. PATENT DOCUMENTS

| | | | |
|---|---|---|---|
| 2,537,428 | 1/1951 | Seon | 252/49.5 X |
| 2,558,759 | 7/1951 | Johnson | 272/56.5 SS X |
| 3,020,811 | 2/1962 | Lincoln et al. | 272/56.5 SS X |
| 3,066,580 | 12/1962 | Alberti | 427/213 |
| 3,069,356 | 12/1962 | Jordan | 252/49.5 X |
| 3,291,486 | 12/1966 | Applegath et al. | 272/56.5 SS |
| 3,443,492 | 5/1969 | Pleass | 427/213 |
| 3,508,945 | 4/1970 | Haemer et al. | 272/56.5 SS X |
| 3,726,799 | 4/1973 | McDole et al. | 252/49.5 |
| 3,731,923 | 5/1973 | Greene | 272/56.5 SS |
| 3,736,847 | 6/1973 | Hickey | 272/56.5 SS |

Primary Examiner—Shrive P. Beck
Attorney, Agent, or Firm—Emory L. Groff, Jr.

[57] ABSTRACT

A finely crushed mixture is prepared which contains at least 10 to 25% by weight of felspar and/or China clay, at least 60 to 85% by weight of quartz and/or calcium carbonate and up to 5% by weight of mica. Said mixture when laid over the desired track is wetted with water or an emulsion of paraffin oil in water. Such an artificial track can remain in position unaltered for several seasons and be covered with snow in winter under favorable climate conditions.

2 Claims, No Drawings

METHOD AND MIXTURE FOR PRODUCING AN ARTIFICIAL SKIING TRACK

This application is a continuation-in-part of application Ser. No. 641,156 filed Dec. 15, 1975, which is a continuation-in-part of application Ser. No. 457,254, filed Apr. 2, 1974 both now abandoned.

It is a well-known fact that the skiing tracks speedily become bare here and there, even when good skiing snow conditions prevail.

On the other hand, at the beginning and at the end of the season, it is often necessary for the skiers to travel over areas entirely devoid of snow, chiefly over routes which are subjected to a large amount of sunshine.

Ski-lifts and the like mechanical elevators cannot generally be used at the beginning and at the end of the season by reason of a lack of snow adjacent the lower end of their course, even if the snow conditions in the areas served by such elevators are excellent.

On the other hand, public favor for winter sports has led to the necessity of providing good skiiing tracks in all seasons.

Gravel mixtures comprising about 78% of quartz gravel, such as obtained from river beds, and about 22% of less hard material such as heavy spar (barite, Ba SO$_4$) which has better gliding properties than quartz are already known as snow substitutes for summer skiing on mountain slopes. Such known gravel mixtures are generally coated with lubricating oil to further improve their gliding properties.

It has now been found that felspar, an aluminum and potassium silicate (KAl Si$_3$O$_8$), has far better gliding properties than heavy spar (Ba SO$_4$). Such gliding properties of felspar are further improved by merely wetting it with water.

Thus, it is no longer necessary to coat a gravel mixture comprising up to 25% of felspar with lubricating oil, to improve its gliding properties. In countries where rain is frequent such improved gliding properties will be automatically maintained.

The present invention has for its object a method for producing an artificial track for skiing in all seasons. According to said method, one covers the ground area which is to form the track with a layer of finely crushed mixture of solid products with a granular size in the range of 0.05 to 0.1 mm including 10 to 25% by weight of felspar and/or China clay, 60 to 85% by weight of quartz and/or calcium carbonate, and up to 5% by weight of mica.

Preferably, the mixture should contain by weight about 10 to 20% of felspar, 60 to 85% of quartz and 5 to 20% of China clay, the components of said mixture being previously finely crushed and sifted, so that the pulverulent mixture obtained may show a granular size ranging between 0.05 and 0.1 mm.

The China clay which is the most expensive component of the mixture may be omitted. A finely crushed mixture of about 10% by weight of felspar with about 90% by weight of quartz also provides satisfactory results.

This mixture is spread over a sloping ground as a sheet of a thickness of about 20 cm, the mixture being then wetted with water, so as to increase its compacity and to lubricate it.

The method described provides not only the possibility of producing good permanent ski tracks over courses which are normally snow-clad in winter, in order to make up for a possible lack of snow on said courses, but also the possibility of preparing artificial skiing tracks on sloping grounds which are seldom covered with snow. In this latter case, channels may be laid on either side of the track, which channels are filled with water and are associated with spraying means adapted to keep the sheet forming the skiing track suitably impregnated and lubricated throughout the year.

Of course, the paths followed by ski-lifts and the like conveyances may be treated similarly and so may be treated the tracks intended for ski-bobs, snow cars, long-distance skiing and those leading to ski-jumps and the free areas underneath the latter.

Since the mixture forming the artificial skiing track is not water-soluble, it can remain in position on the ground during several seasons and in those areas which are normally snow-clad in winter, it can serve as a supporting layer for the snow as soon as the first snow falls occur.

A further improved formula for the above mixture includes:
  40% calcium carbonate
  30% quartz
  10% China clay
  15% felspar
  5% mica This improved mixture is softer and presents even better gliding property for skis provided with a plastic sole, which is the case for most of the skis used for skiing on natural snow tracks.

The addition of 5% mica gives to the ski-track glittering properties under sunshine or artificial light similar to that of natural snow.

Of course, the proportion of calcium carbonate may vary between 30 and 50% while the proportion of quartz may simultaneously vary between 40 and 20%. Similarly, the proportion of China clay may vary between 0 and 25% while the proportion of felspar may simultaneously vary between 25 and 0%.

Generally, the amount of water which is deposited on the artificial ski track mixture is not overly critical. It is only necessary that the mixture be completely impregnated and wetted. Generally, impregnation by rainfall is sufficient to wet the track to the degree necessary to impart optimum gliding properties.

Should the track become dried out it may be re-wetted with water in amounts of at least about 5 liters per 100 kilograms of mixture.

The ski-track mixture of the present invention represents an improvement over those of the prior art in that the use of oil and/or grease with their attendant obvious disadvantages is completely avoided.

The following example illustrates a comparison of the mixture of the present invention with a typical prior art mixture disclosed in U.S. Pat. No. 3,066,580.

EXAMPLE 1

A 60 feet ski trail (inclination: 33°) was covered with an intimate weight admixture of 85% quartz, 10% felspar and 5% kaolin (granulation: and completely impregnated and wetted with water (5 liters per 100 kilograms of mixture). Skis were loaded with 30 kilograms and allowed to freely descend down the trail. The loaded skis required 3 seconds to traverse the entire 60-ft. trail.

The experiment was repeated employing a weight mixture of 77-½% quartz, 22% barite and ½% mineral oil (granulation 0.05 mm). Similarly, loaded skis required 3-¾ seconds and only completed 50 feet of the 60-ft. trail before stopping completely.

What is claimed is:

1. In a method for producing an artificial track for skiing in all seasons, the step consisting of covering the ground area which is to form the track with a layer of an admixture of 85% quartz, 10% feldspar and 5% kaolin having a granular size ranging between 0.05 and 0.1 mm, said layer being completely impregnated and wetted with about 5 liters of water per 100 kilograms of admixture.

2. A method as claimed in claim 1, in which the finely crushed mixture of solid products further comprises up to 5% by weight of mica.

* * * * *